(12) United States Patent
Shargots et al.

(10) Patent No.: US 12,040,099 B2
(45) Date of Patent: Jul. 16, 2024

(54) NUCLEAR REACTOR FUEL ASSEMBLIES AND PROCESS FOR PRODUCTION

(71) Applicant: BWXT Nuclear Energy, Inc., Lynchburg, VA (US)

(72) Inventors: Scott J. Shargots, Forest, VA (US); Scott Lee Fitzner, Appomattox, VA (US); Emily Fleming, Forest, VA (US); Ryan Z. Ziegler, Forest, VA (US); Todd Oswald, Charlotte, NC (US); Earl Brian Barger, Goode, VA (US)

(73) Assignee: BWXT Nuclear Energy, Inc., Lynchburg, VA (US)

( * ) Notice: Subject to any disclaimer, the term of this patent is extended or adjusted under 35 U.S.C. 154(b) by 73 days.

(21) Appl. No.: 17/334,060

(22) Filed: May 28, 2021

(65) Prior Publication Data

US 2021/0375495 A1 Dec. 2, 2021

Related U.S. Application Data

(60) Provisional application No. 63/031,277, filed on May 28, 2020.

(51) Int. Cl.
*G21C 3/33* (2006.01)
*G21C 3/322* (2006.01)
(Continued)

(52) U.S. Cl.
CPC ............. *G21C 3/33* (2013.01); *G21C 3/322* (2013.01); *G21C 5/02* (2013.01); *G21D 5/02* (2013.01)

(58) Field of Classification Search
CPC . G21C 3/322; G21C 3/04; G21C 5/06; G21C 5/14; G21C 5/16; G21C 3/12;
(Continued)

(56) References Cited

U.S. PATENT DOCUMENTS 3,413,196 A * 11/1968 Fortescue ................ G21C 3/04
976/DIG. 18
3,607,643 A * 9/1971 Paget ...................... G21C 5/08
976/DIG. 103

(Continued)

OTHER PUBLICATIONS

International Search Report and Written Opinion, PCT/US2021/34912, dated Sep. 20, 2021, 8 pages.

*Primary Examiner* — Sharon M Davis
(74) *Attorney, Agent, or Firm* — Nelson Mullins Riley & Scarborough LLP (57) ABSTRACT

A nuclear fuel assembly for a nuclear reactor core, the fuel assembly having at least one fuel element including an elongated shell defining an interior volume, a lattice structure disposed within the interior volume, at least one flow channel extending through the lattice structure, at least one lattice site disposed in the lattice structure, and at least one fuel compact disposed within a corresponding one of the at least one lattice site, a first end cap including a boss having a first cross-sectional shape, the first end cap being affixed to a first end of the shell, and a second end cap including a first bore having a second cross-sectional shape, the second end cap being affixed to a second end of the shell, wherein the first cross-sectional shape of the boss is the same as the cross-sectional shape of the bore.

9 Claims, 8 Drawing Sheets

(51) Int. Cl.
 *G21C 5/02* (2006.01)
 *G21D 5/02* (2006.01)

(58) Field of Classification Search
 CPC . G21C 3/30; G21C 3/32; G21C 3/324; G21C 3/33; G21D 5/02; B64G 1/408
 See application file for complete search history.

(56) References Cited

U.S. PATENT DOCUMENTS

| | | | |
|---|---|---|---|
| 3,793,832 A * | 2/1974 | Moon | G21D 5/02 376/385 |
| 4,569,820 A | 2/1986 | Fortescue | |
| 4,772,448 A * | 9/1988 | Popalis | G21C 5/10 411/113 |
| 5,317,611 A | 5/1994 | Petrosky et al. | |
| 5,410,578 A | 4/1995 | Walton | |
| 6,697,448 B1 * | 2/2004 | Korton | G21C 3/07 376/261 |
| 2017/0263345 A1 | 9/2017 | Venneri et al. | |

* cited by examiner

NUCLEAR REACTOR FUEL ASSEMBLIES AND PROCESS FOR PRODUCTION

CLAIM OF PRIORITY

This application claims priority to U.S. Provisional Application No. 63/031,277, filed May 28, 2020, the entire disclosure of which is incorporated by reference herein.

GOVERNMENT SUPPORT CLAUSE

This invention was made with government support under Contract 80MSFC17C0006 awarded by the National Aeronautics and Space Administration. The Government has certain rights in the invention.

TECHNICAL FIELD

The presently-disclosed invention relates generally to nuclear reactors and, more specifically, to fuel assembles for use in constructing reactor cores and processes for producing those fuel assemblies.

BACKGROUND

The concept of utilizing nuclear thermal propulsion to propel space craft during space travel is known. Existing propulsion concepts typically utilize a fuel assembly manufacturing process that includes forming fuel assemblies with individual fuel elements that are placed end to end and then connected to each other by resistance welding, diffusion bonding, etc. These operations are quite difficult and have been known to fail.

There at least remains a need, therefore, for fuel assemblies, and processes for producing the same, that are suitable for use in nuclear thermal propulsion assemblies.

SUMMARY OF THE INVENTION

One embodiment of the present invention provides a nuclear fuel assembly for a nuclear reactor core, having at least one fuel element including an elongated shell defining an interior volume and having a first end and a second end, a lattice structure disposed within the interior volume, at least one flow channel extending through the lattice structure, at least one lattice site disposed in the lattice structure, and at least one fuel compact disposed within a corresponding one of the at least one lattice site, a first end cap including a boss having a first cross-sectional shape, the first end cap being affixed to the first end of the shell, and a second end cap including a first bore having a second cross-sectional shape, the second end cap being affixed to the second end of the shell, wherein the first cross-sectional shape of the boss is the same as the second cross-sectional shape of the bore.

Another embodiment of the present invention provides a nuclear thermal propulsion rocket engine, including a nuclear reactor core, having a first fuel element and a second fuel element, each of the first fuel element and the second fuel element having an elongated shell defining an interior volume and having a first end and a second end, a lattice structure disposed within the interior volume, at least one flow channel extending through the lattice structure, at least one lattice site disposed in the lattice structure, a first end cap including a boss having a first cross-sectional shape, the first end cap being affixed to the first end of the shell, and a second end cap including a first bore having a second cross-sectional shape, the second end cap being affixed to the second end of the shell, wherein the first cross-sectional shape of the boss is the same as the second cross-sectional shape of the bore, and the boss of the first end cap of the first fuel element is disposed within the bore of the second end cap of the second fuel element.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements.

Repeat use of reference characters in the present specification and drawings is intended to represent same or analogous features or elements of the invention according to the disclosure.

Detailed Description

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
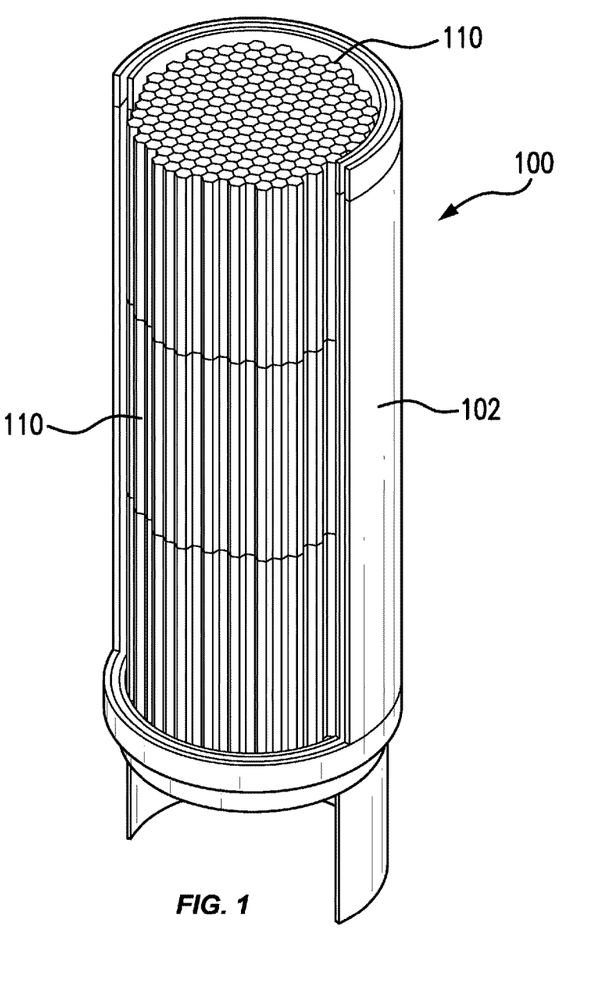
FIG. 1 is a perspective view of a nuclear reactor core including fuel assemblies constructed in accordance with an embodiment of the present invention.
Figure 2:
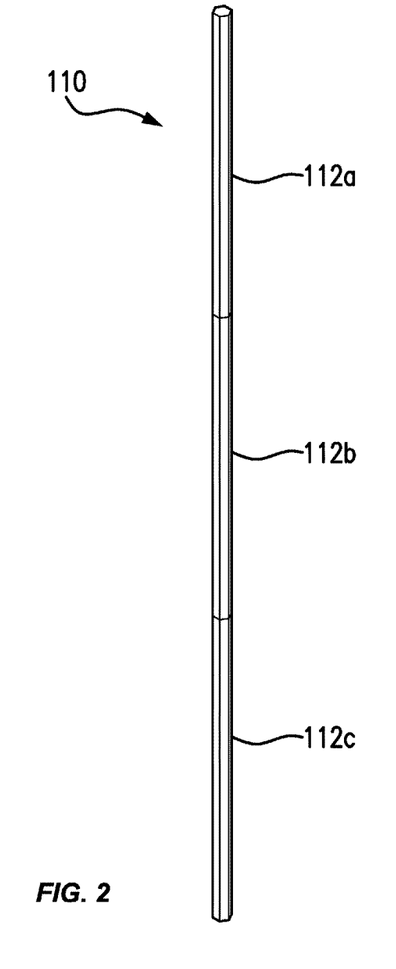
FIG. 2 is a perspective view of a fuel assembly in accordance with an embodiment of the present invention.
Figure 12:
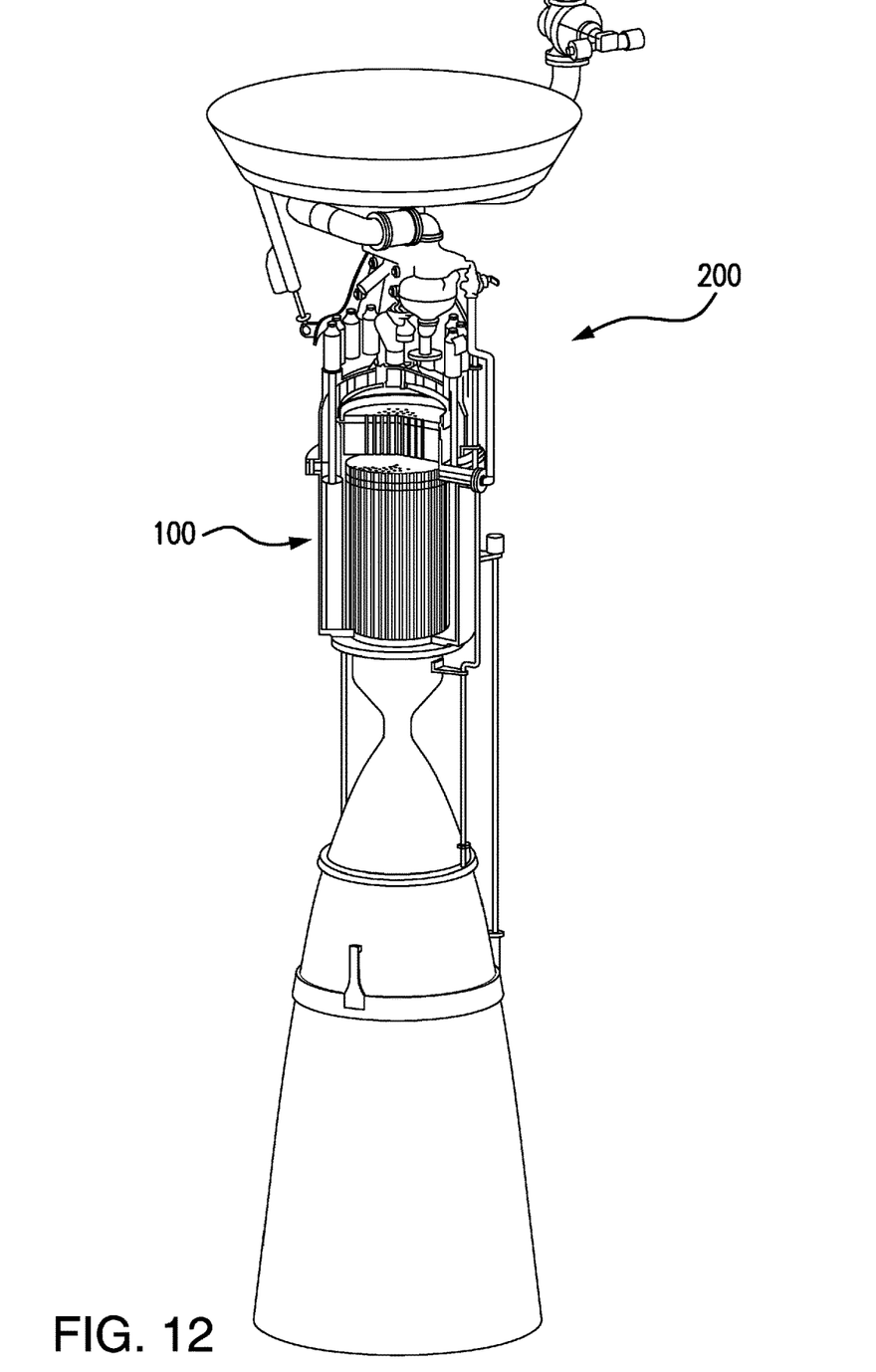
FIG. 12 is a perspective view of a nuclear thermal propulsion rocket engine including a nuclear core comprised of fuel assemblies according to the present invention.

As used herein, terms referring to a direction or a position relative to the orientation of a nuclear reactor fuel assembly, such as but not limited to "vertical," "horizontal," "top," "bottom," "above," or "below," refer to directions and relative positions with respect to the nuclear reactor fuel assembly's operation, as indicated in FIGS. 1, 2, and 12. Thus, for instance, the terms "vertical" and "top" refer to the vertical orientation and relative upper position in the perspective of FIGS. 1, 2, and 12, and should be understood in that context, even with respect to a nuclear reactor fuel assembly that may be disposed in a different orientation.

Further, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "and" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "and," and "the" may include plural references, and the meaning of "in" may include "in" and "on." The phrase "in one embodiment," as used herein, does not necessarily refer to the same embodiment, although it may.

Figure 3:
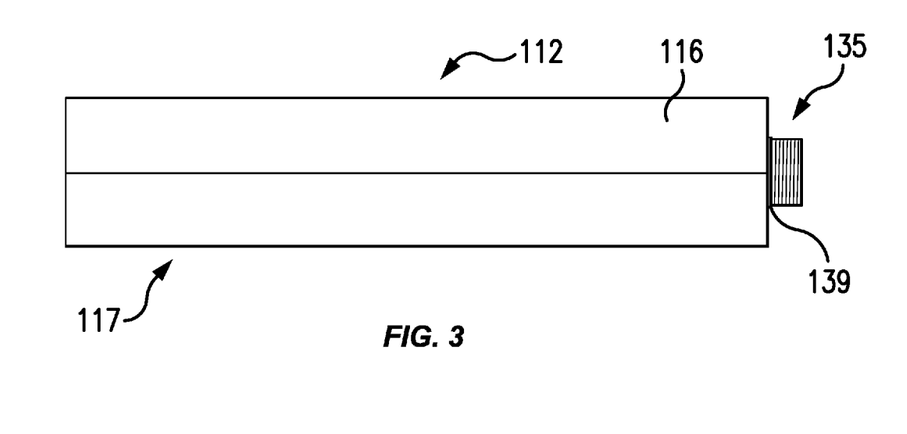
FIG. 3 is a side view of a fuel element in accordance with an embodiment of the present invention.
Figure 4:
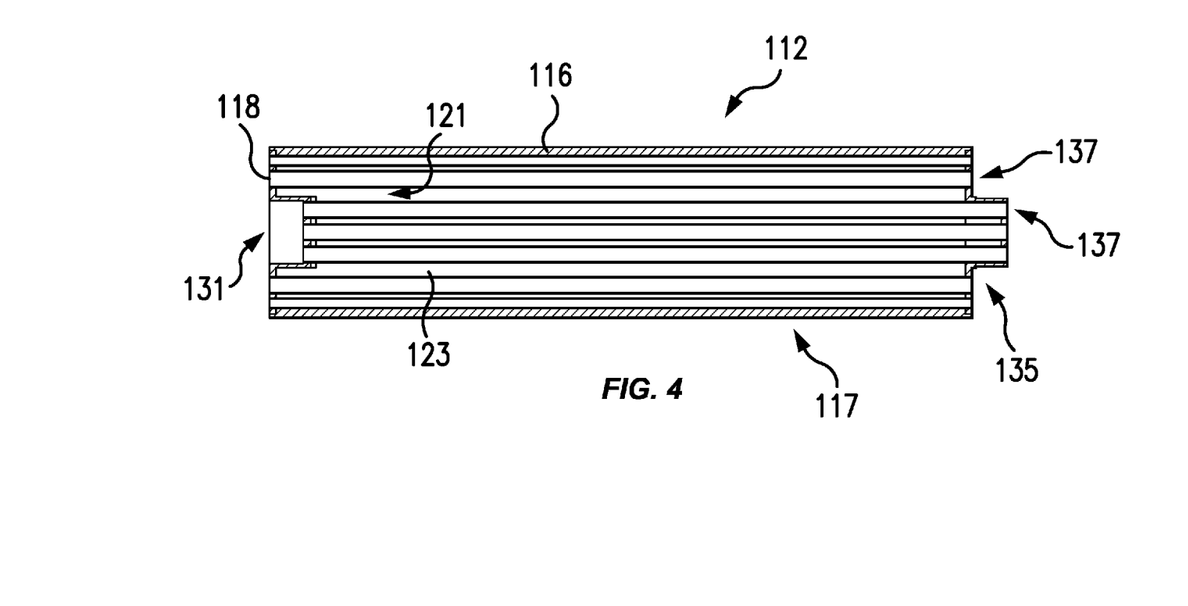
FIG. 4 is a cross-sectional view of the fuel element shown in FIG. 3, taken along line 4-4 of FIG. 6.
Figure 6:
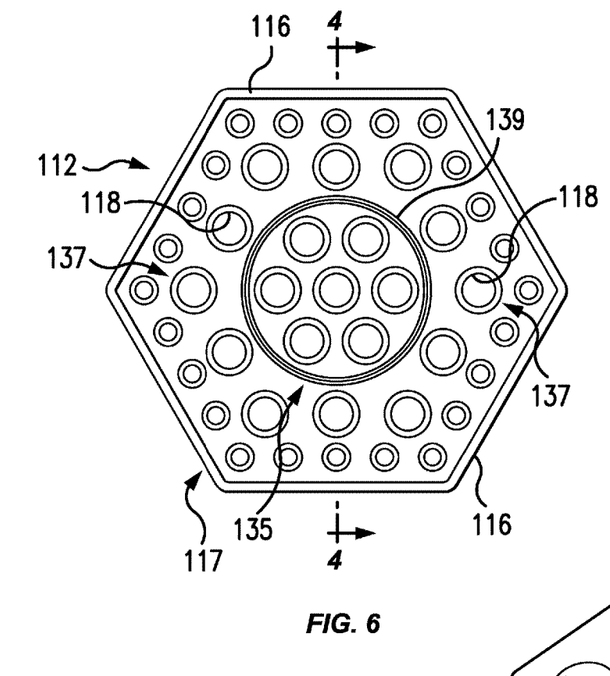
FIG. 6 is a plan view of an end of the fuel element shown in FIG. 3.

Referring now to the figures, a nuclear reactor core 100 for use in a nuclear thermal propulsion (NTP) rocket 200 (FIG. 12), in accordance with the present invention, includes a plurality of modular fuel assemblies 110 that are received in a vessel shell 102 of the nuclear reactor core 100, as best seen in FIGS. 1 and 2. Preferably, each fuel assembly 110 is formed by a plurality of fuel elements 112a, 112b, 112c, etc., as discussed in greater detail below. Referring additionally to FIGS. 3, 4, and 6, each fuel element 112 preferably includes a shell 117 that has a hexagonal cross-section. A lattice structure 121 is disposed within the shell 117 of each fuel element 112 and defines a plurality of lattice sites. Each lattice site is configured to receive a correspondingly-shaped fuel compact 123 therein. The structure and composition of various fuel compacts is known in the art, and not relevant to the present disclosure. As such, details of the various fuel compacts are not discussed herein. Note, although the discussed fuel element 110 preferably has a hexagonal cross-section based upon the configuration of the fuel elements 112 utilized in its construction, in alternate embodiments the fuel elements may have different cross-sectional shapes such as, but not limited to, triangular, square, rectangular, etc.

Figure 5A:
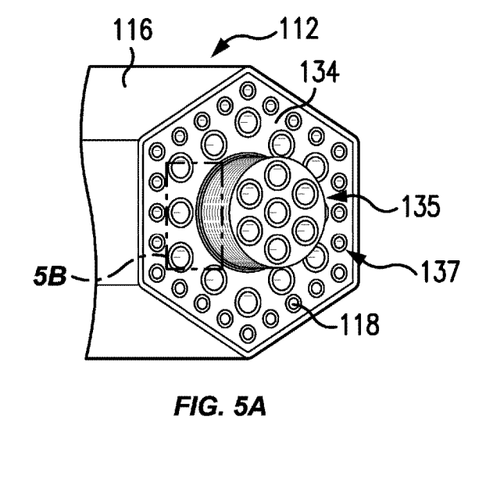
FIGS. 5A through 5C are perspective partial cut-away views of the opposing ends of the fuel element shown in FIG. 3.
Figure 5B:
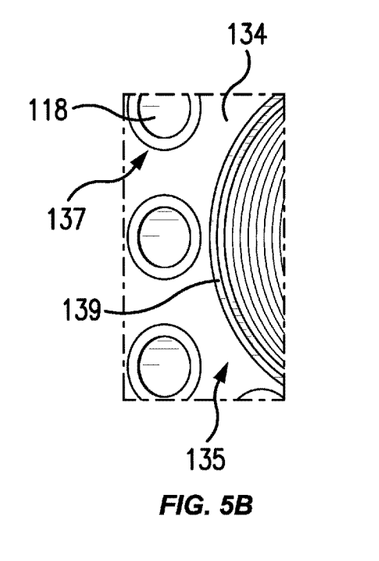

Referring additionally to FIGS. 5A and 5B, as noted above, each fuel element 112 includes a plurality of sidewalls 116 defining an elongated hexagonal shell 117. In addition to the discussed plurality of lattice sites for receiving the fuel compacts 123, the lattice structure 121 also includes a plurality of bores, each bore being configured to receive a correspondingly-shaped elongated tube 118 therein. Each of the elongated tubes 118 is disposed within the lattice 121 and, therefore, shell 117 so that a longitudinal center axis of each elongated tube 118 is parallel to a longitudinal center axis of shell 117. As well, each fuel element 112 includes a first end cap 134, FIGS. 5A and 5B, and a second end cap 136, FIG. 5C, that provide a seal at opposite ends of the elongated shell 117. Each elongated tube 118 extends the full length of shell 117, thereby forming channels through which reactor coolant may flow during reactor operations.

Figure 5C:
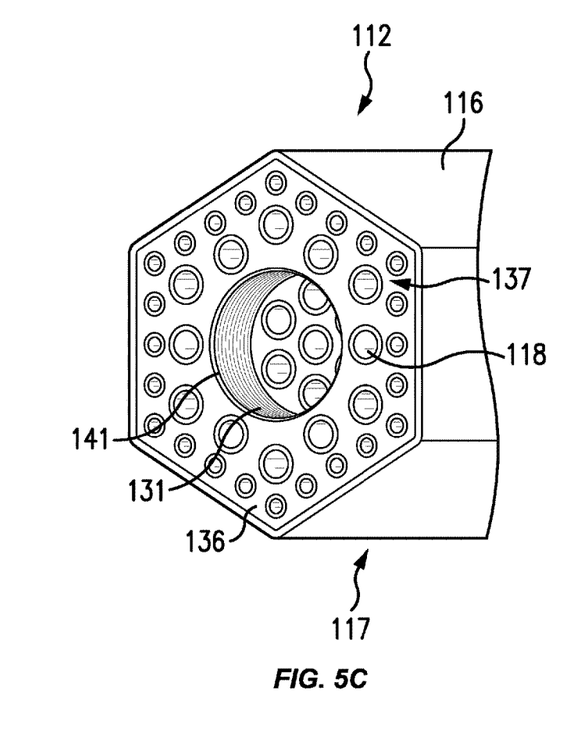

After each lattice site receives a corresponding fuel compact 123 therein, the first end cap 134 and the second end cap 136 are welded, such as by resistive welding, laser welding, electron-beam welding, or gas tungsten arc welding (GTAW), to the opposite ends of the shell 117 to complete construction of each fuel element 112. Both the first and the second end caps 134 and 136 include a plurality of apertures 137, each aperture 137 corresponding to a location of one of the lattice's elongated tubes 118 so that reactor coolant may flow therethrough. Note, the ends of each elongated tube 118 are preferably welded to the inner perimeters of the apertures 137 of the first and the second end caps 134 and 136, respectively, in which they are received.

Each fuel element 112 also includes features for connecting each fuel element 112 to an adjacent fuel element, as shown in FIG. 2. Specifically, one of the first end cap 134 and the second end cap 136 includes a cylindrical boss 135, and the other of the first end cap 134 and the second end cap 136 includes a cylindrical bore 131 that is configured to receive the cylindrical boss 135 of an adjacent fuel element 112 therein. As best seen in FIGS. 5A and 5B, the cylindrical outer surface of each boss 135 is threaded and the cylindrical inner wall of each bore 131 is correspondingly-threaded, as best seen in FIG. 5C, so that adjacent fuel elements, i.e., 112a and 112b, may be threadedly connected. As such, existing methods, such as, but not limited to, resistance welding, staking, diffusion bonding, etc., are not required to connect adjacent fuel elements 112 when forming fuel assemblies 110 in accordance with the present disclosure. Preferably, each boss 135 and each bore 131 is formed by extruding outwardly on one of the first end cap 134 and the second end cap 136, and extruding inwardly on the other of the first end cap 134 and the second end cap 136, respectively, when forming the end caps. Additionally, as best seen in FIG. 5B, a raised shoulder 139 is preferably disposed at the end of the threads at the base of each boss 135, the raised shoulder 139 mating with corresponding counterbore 141 formed in each bore 131 to insure flow channels 118 on the connected fuel elements 112 are properly aligned after assembly.

Figure 7:
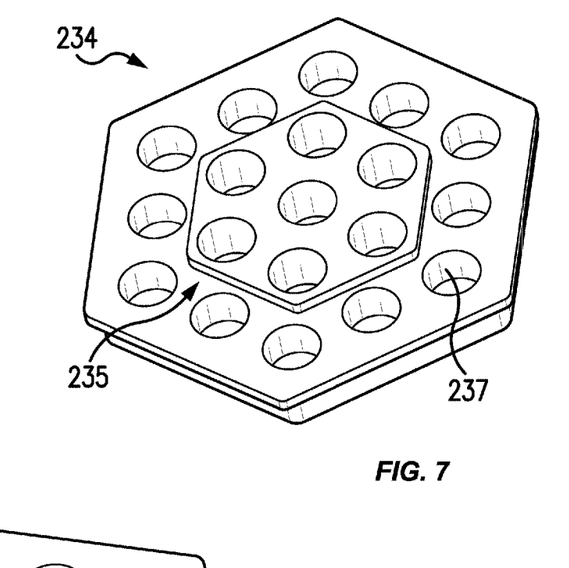
FIGS. 7 and 8 are perspective views of end caps for fuel elements in accordance with an alternate embodiment of the present invention.
Figure 8:
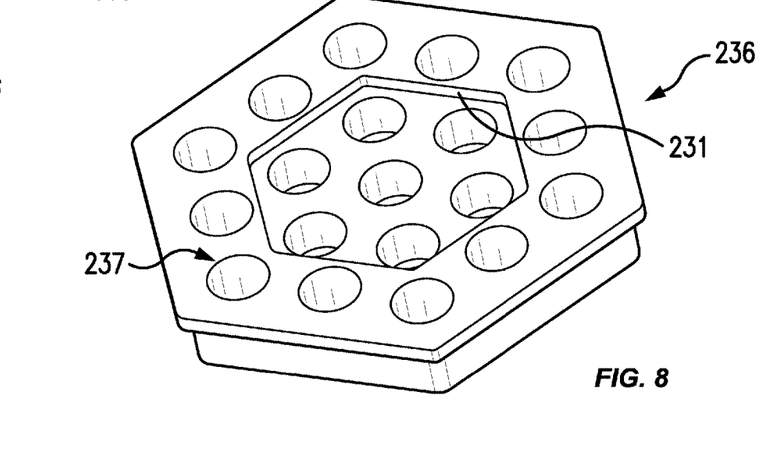
Figure 9A:
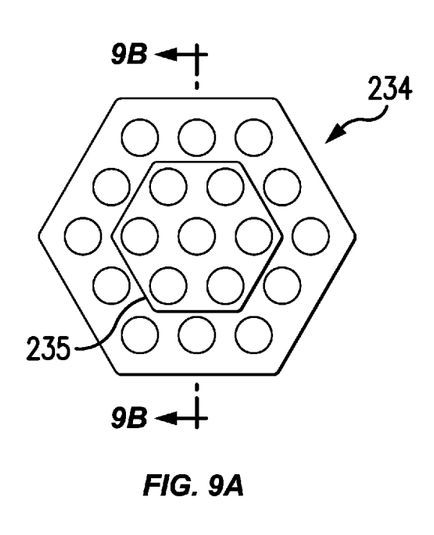
FIGS. 9A through 9C are plan views and a cross-sectional view of the end cap shown in FIG. 7.
Figure 9B:
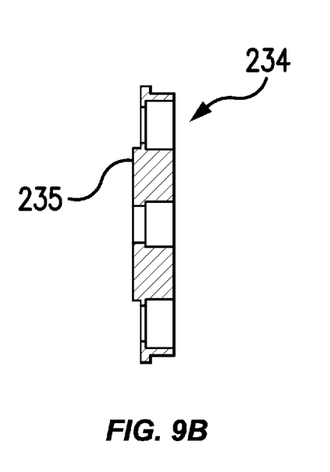
Figure 9C:
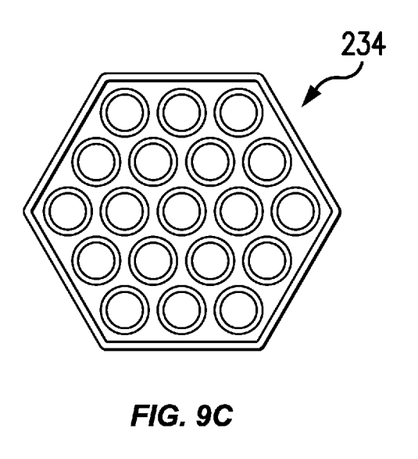
Figure 10A:
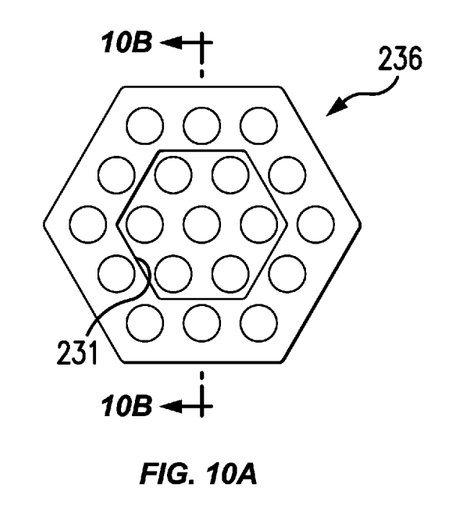
FIGS. 10A through 10C are plan views and a cross-sectional view of the end cap shown in FIG. 8.
Figure 10B:
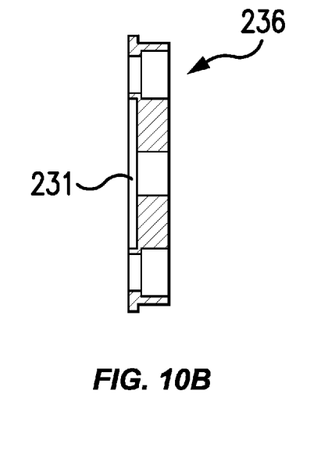
Figure 10C:
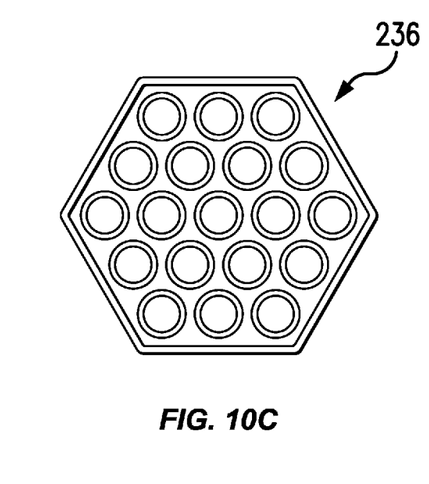
Figures 11A, 11B, 11C:
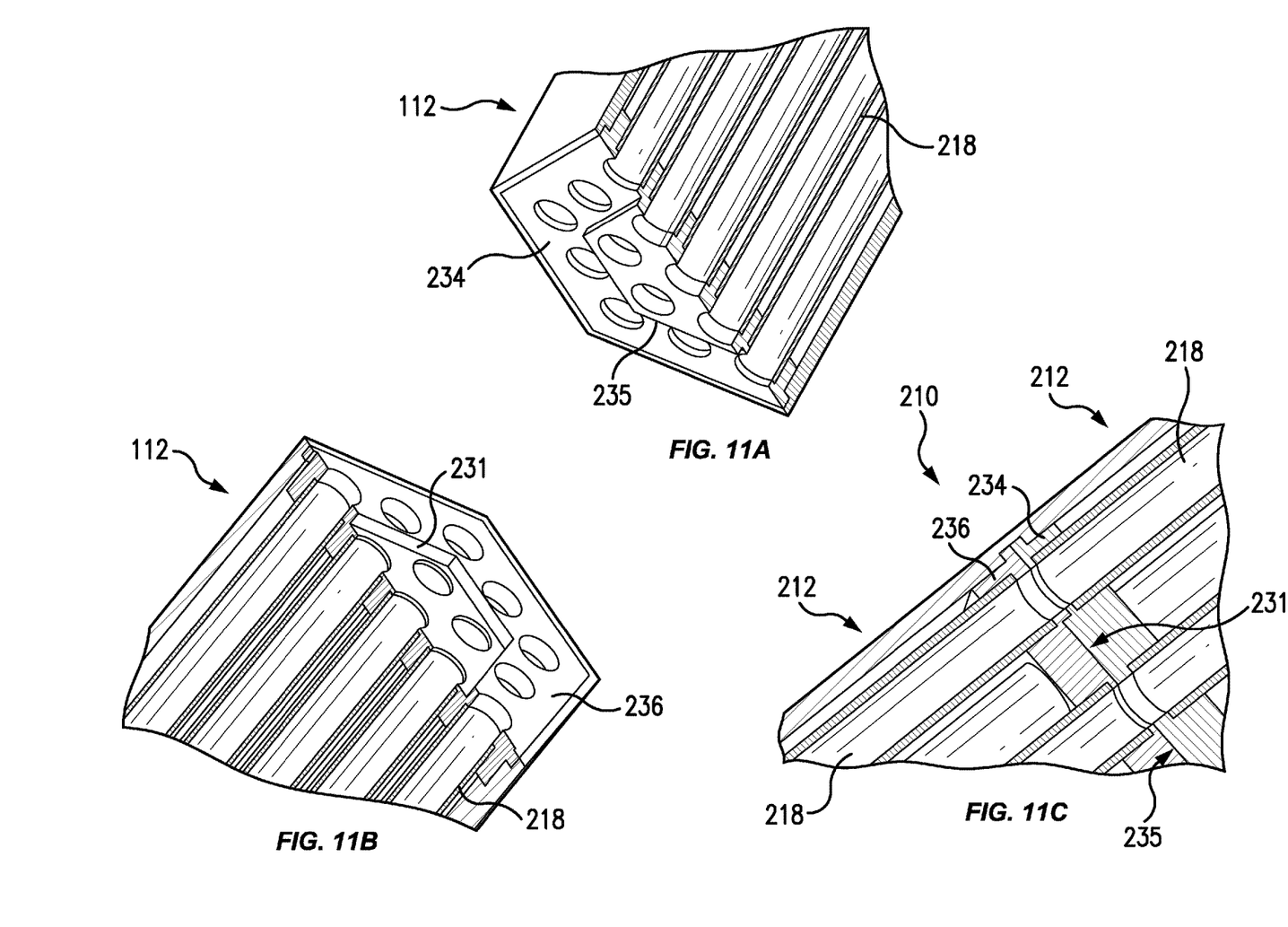
FIGS. 11A through 11C are perspective partial cross-sectional views of an alternate embodiment of fuel elements in accordance with an embodiment of the present invention.

As shown in FIGS. 7 and 8, an alternate embodiment of a fuel element 212 in accordance with the present disclosure includes a first end cap 234 (FIGS. 9A through 9C) having a boss 235 with a hexagonally-shaped cross-section, and a second end cap 236 (FIGS. 10A through 10C) having a recess 231 with a correspondingly-shaped hexagonal cross-section. The adjacent fuel elements are non-rotatably connected to each other, as shown in FIGS. 11A through 11C, by positioning each boss 235 of the first end cap 234 in corresponding recess 231 of an adjacent fuel element's second end cap 236. Unlike the previously discussed embodiment, adjacent fuel elements 212 are allowed to move axially with respect to each other during expansion and contraction of the fuel elements 212 that occurs due to thermal changes during operation of the NTP as they are not axially-affixed to each other.

In that fuel assemblies in accordance with the present invention are constructed of individual fuel elements that are then fastened to each other both axially and non-rotatably, such as fuel assembly 110 shown in FIG. 2, or just non-rotatably, such as fuel assembly 210 shown in FIG. 11B, the material composition of the fuel within each corresponding fuel element 112, 212 may be varied from the other fuel elements 112, 212. As such, the material gradient of each fuel assembly 110, 210 may be varied along its axial length. For example, referring specifically to FIG. 2, reduced amounts of tungsten may be used in fuel element 112a that forms the upper portion of fuel assembly 110, as compared to the amount of tungsten used in fuel element 112c, which forms the bottom portion of fuel assembly 110. Although it may be desirable to have increased amounts of tungsten in the bottom fuel element 112c due to elevated temperatures in that portion of the reactor core, it may be desirable to reduce the amounts of tungsten in fuel element 112a and 112b as the temperature is lower in higher positions within the core of the reactor. This can be advantageous in that tungsten has a large nuclear cross section that negatively affects the nuclear reaction and is heavier than various other materials, such as molybdenum, that may be used in its place where lower temperatures are encountered.

These and other modifications and variations to the invention may be practiced by those of ordinary skill in the art without departing from the spirit and scope of the invention, which is more particularly set forth in the appended claims. For example, in alternate embodiments of the present invention, rather than disposing fuel compacts in corresponding lattice sites when constructing fuel elements, as described above, a fuel dispersion method may be used to fill the interior of the lattice structure that surrounds the flow channels. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

The invention claimed is:

1. A nuclear fuel assembly for a nuclear reactor core, comprising:
   at least one fuel element comprising:
      an elongated shell defining an interior volume and having a first end and a second end;
      a lattice structure disposed within the interior volume;
      a plurality of flow channels extending through the lattice structure;
      at least one lattice site disposed in the lattice structure;
      a first end cap including a boss having a first cross-sectional shape, the first end cap being affixed to the first end of the shell and having a plurality of first end cap apertures respectively corresponding to the plurality of flow channels; and
      a second end cap including a first bore having a second cross-sectional shape, the second end cap being affixed to the second end of the shell and having a plurality of second end cap apertures respectively corresponding to the plurality of flow channels,
   wherein the first cross-sectional shape of the boss is the same as the second cross-sectional shape of the bore; and
   wherein some but not all of the first end cap apertures are encompassed by the boss and a corresponding number of second end cap apertures are encompassed by the bore;
   wherein the first and the second cross-sectional shapes are round; and wherein:
   the boss of the first end cap includes a cylindrical outer surface, the cylindrical outer surface including an outer threaded portion, and
   the first bore of the second end cap includes a cylindrical inner surface, the cylindrical inner surface including an inner threaded portion.

2. The fuel assembly of claim 1, further comprising:
   an annular shoulder disposed around a perimeter of the boss adjacent an outer surface of the first end cap; and
   an annular counterbore defined by the second end cap about a perimeter of the bore adjacent an outer surface of the second end cap.

3. The fuel assembly of claim 1, the at least one fuel element further comprising at least one fuel compact disposed within a corresponding one of the at least one lattice site.

4. The fuel assembly of claim 1, the at least one fuel element further comprises respective elongated tubes disposed within the flow channels of the lattice structure.

5. The fuel assembly of claim 4, wherein a first end of each elongated tube is disposed within a respective aperture defined by the first end cap, and a second end of each elongated tube is disposed within a respective aperture defined by the second end cap.

6. The fuel assembly of claim 1, wherein the at least one fuel element comprises a first fuel element and a second fuel element, and a boss of the first end cap of the first fuel element is disposed within a bore of the second end cap of the second fuel element.

7. A nuclear thermal propulsion rocket engine comprising:
   a nuclear reactor core, comprising:
      a first fuel element and a second fuel element connected end-to-end, each of the first fuel element and the second fuel element comprising:
         an elongated shell defining an interior volume and having a first end and a second end;
         a lattice structure disposed within the interior volume;
         a plurality of flow channels extending through the lattice structure;
         at least one lattice site disposed in the lattice structure;
         a first end cap including a boss having a first cross-sectional shape, the first end cap being affixed to the first end of the shell and having a plurality of first end cap apertures respectively corresponding to the plurality of flow channels; and
         a second end cap including a first bore having a second cross-sectional shape, the second end cap being affixed to the second end of the shell and having
         a plurality of second end cap apertures respectively corresponding to the plurality of flow channels,
      wherein the first cross-sectional shape of the boss is the same as the second cross-sectional shape of the bore,
      wherein some but not all of the first end cap apertures are encompassed by the boss and a corresponding number of second end cap apertures are encompassed by the bore,
      and wherein the boss of the first end cap of the first fuel element is disposed within the bore of the second end cap of the second fuel element;
   wherein the first and the second cross-sectional shapes are round; and wherein:
> the boss of the first end cap of the first fuel element includes a cylindrical outer surface, the cylindrical outer surface including a threaded portion, and
>
> the first bore of the second end cap of the second fuel element includes a cylindrical inner surface, the cylindrical inner surface including a threaded portion that is correspondingly-threaded to the threaded portion of the outer surface of the outer surface of the first end cap of the first fuel element.

8. The rocket engine of claim 7, further comprising:
an annular shoulder disposed around a perimeter of the boss of each first end cap adjacent an outer surface of each first end cap; and
an annular counterbore defined by each second end cap about a perimeter of the bore adjacent an outer surface of each second end cap.

9. The rocket engine of claim 7, wherein the first fuel element and the second fuel element both further comprising at least one fuel compact disposed within a corresponding one of the at least one lattice sites.

\* \* \* \* \*